2,817,579
Patented Dec. 24, 1957

2,817,579

CATALYTIC PROCESS FOR PREPARING RED CUPROUS OXIDE

Joseph E. Drapeau, Jr., Calumet City, Ill., and Paul D. Johnson, Gary, Ind., assignors to The Glidden Company, Cleveland, Ohio, a corporation of Ohio No Drawing. Application March 19, 1953
Serial No. 343,514

5 Claims. (Cl. 23—147)

This invention relates to a novel catalytic process for converting off-color cuprous oxide into red cuprous oxide.

Mixtures containing cuprous oxide and cupric oxide with or without metallic copper are available commercially as the end product of a variety of processes. For instance, the well known copper ammonium carbonate leaching process for the extraction of copper gives as its final product a mixture of copper oxides. Furthermore, the roasting of metallic copper such as scrap copper usually produces a mixture of copper oxides, particularly when metallic copper remains in the mass at the conclusion of the roasting. In such a process, the roasted mass is tumbled or otherwise abraded to remove the oxides from the metallic copper, after which the oxides are separated from the metallic copper, and the latter is recycled for additional roasting. See U. S. Patent No. 2,304,078, to Drapeau et al.

Mixtures of oxides such as result from the above and other processes can be used for the preparation of cuprous oxide. Moreover, cupric oxide alone can also be used either by first subjecting it to a mild reduction so as to prepare a mixture of metallic copper with cuprous and cupric oxides, or by mixing it directly with metallic copper, or both.

Suitable mixtures such as described above are hereinafter referred to as "oxidic copper mixtures."

Our divisional application Serial No. 577,200, filed April 10, 1956, describes and claims a catalytic process which effects the conversion of such oxidic copper mixtures into cuprous oxide, and is based on our discovery that such conversion can be accomplished on a commercial basis by the use of aqueous ammonia as a catalyst therefor when the total reducing power of the mixture is between about 95% and 105%. The present invention relates to an after-treatment of the cuprous oxide so prepared to change its color from a muddy brown to a clean red.

Accordingly, it is an object of this invention to provide a novel commercial process for preparing red cuprous oxide from oxidic copper mixtures having a total reducing power around 95% to 105%.

Another object is to provide a novel process for preparing red cuprous oxide from off-color cuprous oxide.

These and other objects will be apparent from the following description of the invention.

As described in our divisional application, supra, we have found that when an oxidic copper mixture has a total reducing power between about 95% and 105% that of $Cu_2O$, it can be treated with a small, catalytic amount of aqueous ammonia under substantially non-oxidizing conditions at temperatures between about 40° F. and 150° F. for a suitable period of time to cause the mixture to be converted to cuprous oxide of at least sufficient purity to meet current commercial specifications. Such specifications usually correspond to U. S. Navy specification MIL-C-15169, and call for a minimum of 95% cuprous oxide on grade II material, 97% cuprous oxide on grade I material, and a minimum total reducing power of 97% on either grade.

The amounts of ammonia ($NH_3$) used in such treatment can be from about 0.5% to 5.0% or more by weight on the oxidic copper mixture, but since the effect is catalytic in nature there is little need to use more than will effect the desired conversion within the desired period of time. We prefer to use amounts of ammonia corresponding to between about ½% and 3% of $NH_3$ by weight on the oxidic copper mixture being treated.

The foregoing amounts of ammonia can be dissolved in any desired amount of water to give a solution ranging from very dilute up to saturation. However, since all of the treated mass must usually be dried prior to shipping, we prefer to use as little water as is consistent with good wetting of the charge and with an economical over-all treatment cost, such as an amount between about 15% and 30% by weight of the mixture being treated.

We have found that mixtures containing up to 11% free copper can be treated commercially by our process without requiring an unusually prolonged treating time. If treating time is not a factor to be considered, then mixtures of cupric oxide and metallic copper which have a total reducing power between about 95% and 105% can be converted by our process to specification-grade cuprous oxide. It is more practical cost-wise, of course, to reduce the cupric oxide to a mixture of $Cu_2O$ and CuO, with or without metallic copper, since less added metallic copper is then needed to bring the total reducing power up to the range stated above.

Without wishing to be bound by the theory here expressed, we believe that the reactions which are promoted by the aqueous ammonia catalytic treatment are represented by the following equations:

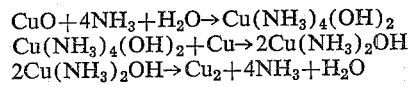

The cyclic nature of the reactions is evident from these equations. It is also evident that when the mechanism of the reactions is disregarded, the ultimate reaction promoted by the aqueous ammonia is:

Accordingly, it will be clear that the starting mixture should have its CuO content and its metallic copper content substantially in balance on a stoichiometric basis; this of course is the same thing as calling for a total reducing power around 100%. When the total reducing power is not exactly 100%, but is between about 95% to 105%, then either CuO or Cu remains in slight excess at the conclusion of the treatment. Moreover, since some slight amount of oxidation of $Cu_2O$ by air may occur even in a closed container during the course of the treatment, additional small quantities of CuO are formed and either add to the excess CuO when the initial total reducing power was below 100%, or consume some of the metallic copper which would otherwise remain when the initial total reducing power was over 100%. Those skilled in the art will understand that such adventitious results can be suitably offset by minimizing oxidation by the air and by initially adjusting the total reducing power of the charge.

The following example illustrates the above-described catalytic treatment:

*Example 1*

An oxidic copper mixture having a total reducing power below 70% and containing practically no free copper was reduced by heating in a furnace having a gaseous reducing atmosphere until the total reducing power had reached approximately 100%. The reduced mass, upon chemical analysis, was found to consist of:

| | Percent |
|---|---|
| Free copper | 9.06 |
| Cuprous oxide | 81.06 |
| Cupric oxide | 9.88 |
| | 100.00 |

Sixteen thousand pounds of the reduced mass was introduced into a substantially closed but vented steel drum capable of being slowly rotated about a horizontal axis, and of being heated externally when desired. Four hundred gallons of water and 110 gallons of aqua ammonia (29.4% $NH_3$) were added. The drum was closed to prevent oxidation of the wet charge, and was slowly rotated for 24 hours, no heat being applied during this period. At the end of the 24 hour period, enough heat was applied to the drum to cause water and ammonia to be evaporated and exhausted at a convenient rate through the vent. The drum was rotated under these conditions until the contents had been dried, which required about 16 hours. The resulting dry material had a total reducing power of 100%, and had the following chemical analysis:

| | Percent |
|---|---|
| Free copper | 1.31 |
| Cuprous oxide | 97.03 |
| Cupric oxide | 1.66 |
| | 100.00 |

The color of the treated product was somewhat brownish, but was better than that of the original mixed oxides.

The amount of $NH_3$ added in the above treatment amounted to about 1.53% by weight on the partially reduced mass.

The ammonia driven off during the drying treatment can be recovered for recycling to subsequent batches.

While the total reducing power of the original oxidic copper mixture used in Example 1 was adjusted to 100% by a gaseous reduction treatment, it should be understood that this adjustment of reducing power can be effected just as well by adding metallic copper powder to the original mixture. The following example illustrates this manner of adjusting the total reducing power.

*Example 2*

A charge of impure cuprous oxide in the amount of 15,191 pounds was introduced into a drum of the type described in Example 1. The charge had a total reducing power of 94.30% and analyzed:

| | Percent |
|---|---|
| Free copper | 1.93 |
| Cuprous oxide | 89.95 |
| Cupric oxide | 8.12 |
| | 100.00 |

Fine copper powder in the amount of 893 pounds was added to and mixed with the charge in the drum, thereby bringing the total reducing power of the resulting mixture to 101.53%. Aqua ammonia (29.4% $NH_3$) and water were added to the mixture in the amounts of 110 gallons and 400 gallons respectively, and the closed drum was rotated for 40 hours. A sample of the material was then dried out by heating, and was found then to have a brown color. The dry material had a total reducing power of 99.0% and analyzed:

| | Percent |
|---|---|
| Cuprous oxide | 95.90 |
| Free copper | 1.38 |
| Cupric oxide | 2.72 |
| | 100.00 |

*Example 3*

To improve the color of the product which would be obtained if the treated material of Example 2 were to be dried, 120 pounds of sodium hydroxide was added to the ammonia-treated charge still in the drum, after which the drum was closed and was rotated for two hours. Then the drum and charge were heated to dry the charge. The resulting product had a clean red color and contained about 1.5% free copper, balance substantially all cuprous oxide. The treated product was subsequently adjusted as to total reducing power and then was ground to pass through a 325 mesh sieve, only 0.18% being coarser than 325 mesh.

*Example 4*

The brownish, dried product of Example 1 was treated by rotating it for two hours in the closed drum with 400 gallons of water and 75 pounds of sodium hydroxide. The charge was then dried out in the drum and was subsequently ground to prepare it for use as a pigment. The resulting pigment had a clean red color which was free of brownish colorations when a small amount was spread on a glass slide for observation. The sample on the slide was stored for about 4 months while exposed to air and daylight. At the end of that time it still exhibited a clean red color and was free of brownish colorations, thereby indicating its color stability.

From Examples 1 and 2, it will be understood that the adjustment of the total reducing power of a charge of mixed oxides which is to be treated can be effected either by subjecting the charge to a reduction treatment, or by adding fine metallic copper, or by a combination of both. It should also be understood that after the treatment has been completed, if the total reducing power is not at the usually desired level of 100%, it can again be adjusted by means of any of the same expedients.

In reference to the treatment of the catalytically converted material with sodium hydroxide as in Examples 3 and 4 to improve its color, this treatment can be effected at temperatures between about 40° F. and 150° F. by using as little as ¼% of sodium hydroxide or by as much as 2%. In fact, there is no real upper limit on the amount, since large excesses over 2% do no harm. Preferably, however, the amount of caustic is kept as low as possible, since it is usually not removed from the finished powder. We prefer to use from ½% to 1% of any alkali metal hydroxide in the treatment, and especially prefer sodium hydroxide because of its availability and lower cost.

The amount of water employed along with the caustic soda in the color-modifying treatment is not critical except that enough water should be present to dissolve the caustic and to wet the charge and distribute the caustic soda evenly throughout the charge. As little water as 10% by weight of the charge can be used, but we prefer to use from 15% to 30% so as to avoid much balling of the charge during the treatment.

The treatment with alkali-metal hydroxide appears to cause the agglomeration of fine particles of cuprous oxide, and it may be this action which brings about the observed change in color. Fine particles of cuprous oxide, e. g., those less than about ½ micron in diameter are generally of a yellow or dark brown color. Agglomeration of such particles into larger particles may cause the color to change to the red color which is conventionally associated with commercial cuprous oxide. Whatever may be the true explanation, there remains the observed improvement in color resulting from the treatment of off-color cuprous oxide with alkali-metal hydroxide(s).

It should be noted that in Example 3, the catalytically treated cuprous oxide was not dried before it was subjected to the described treatment with caustic soda to improve its color. This is the practical way to practice the invention where both treatments are employed since it saves the cost of the one drying operation. Example 4 illustrates the application of the color-improving treatment to a dry, off-color cuprous oxide.

We have discovered that the caustic treatment for color improvement can be applied to any moderately pure cuprous oxide having a total reducing power above about 95%. Hence the treatment need not be restricted only to cuprous oxide prepared by the hereindescribed catalytic ammonia conversion. The following example illustrates the general utility of the treatment, as does Example 4 above.

*Example 5*

Two hundred parts of 95% cuprous oxide having a decided brown color were mixed with 40 parts of water and 2 parts of sodium hydroxide in a glass container. The container was tightly closed except for a small exhaust tube which was fitted with a Bunsen valve. The valve functioned to prevent the entry of air into the container but permitted excess gaseous pressure within the container to be vented to the atmosphere. The mixture in the container was shaken occasionally while it was being heated to dryness. The resulting cuprous oxide had a clean red color.

Reference is made to applicants' copending application Serial No. 350,777, filed April 23, 1953, now U. S. Patent 2,758,014, issued August 7, 1956, which describes and claims another wholly different method for converting mixtures of cupric oxide and metallic copper to cuprous oxide.

Having now described our invention, what we claim is:

1. The process of preparing red cuprous oxide from brownish and similar non-red off-color cuprous oxide having a total reducing power above about 95%, which comprises: treating said off-color cuprous oxide with a weak aqueous solution of alkali metal hydroxide having a concentration up to about 20% and providing 10–30% of water and a small percentage, at least 0.25%, of alkali metal hydroxide, both percentages being by weight of the said off-color cuprous oxide, under substantially non-oxidizing conditions and at temperatures between about 40° F. and 150° F. until the cuprous oxide exhibits a clean red color; and thereafter drying the resulting mass of material to recover dry cuprous oxide having a red color.

2. The process as claimed in claim 1 wherein the aqueous solution of alkali metal hydroxide provides between about 0.25% and 2% of alkali metal hydroxide and from about 15% to 30% of water by weight of the off-color cuprous oxide.

3. The process as claimed in claim 2 wherein the alkali metal hydroxide is caustic soda.

4. The process as claimed in claim 1 wherein the said aqueous solution of alkali metal hydroxide provides between about 0.5% and 1% of alkali metal hydroxide and from about 15% to 30% of water by weight of the off-color cuprous oxide.

5. The process as claimed in claim 4 wherein the alkali metal hydroxide is caustic soda.

References Cited in the file of this patent

UNITED STATES PATENTS

| | | |
|---|---|---|
| 1,131,986 | Benedict | Mar. 16, 1915 |
| 1,867,357 | Furness | July 12, 1932 |
| 2,474,497 | Rowe | June 28, 1949 |

OTHER REFERENCES

J. W. Mellor's "A Comprehensive Treatise on Inorganic and Theoretical Chem.," vol. 3, 1923 ed., p 124. Longmans, Green and Co., New York.